United States Patent [19]

Hoelscher

[11] 4,310,275
[45] Jan. 12, 1982

[54] TILTING PLATFORM HAY BALE ACCUMULATOR

[76] Inventor: Darrel G. Hoelscher, R.R. 1, Bushton, Kans. 67427

[21] Appl. No.: 41,709

[22] Filed: May 23, 1979

[51] Int. Cl.³ ............................................. A01D 87/12
[52] U.S. Cl. ...................................... 414/111; 414/501
[58] Field of Search ...................... 414/111, 44, 38, 39, 414/107, 473, 486, 487, 493, 501, 552, 680, 773, 902; 56/473.5

[56] References Cited

U.S. PATENT DOCUMENTS

| 3,157,295 | 11/1964 | Pridgeon et al. | 414/111 |
| 3,330,424 | 7/1967 | Grey et al. | 414/44 X |
| 3,414,139 | 12/1968 | Strommen | 414/35 |

Primary Examiner—Frank E. Werner
Attorney, Agent, or Firm—Laurence R. Brown

[57] ABSTRACT

This invention provides a novel hay bale accumulator arranged in an improved baling system to mate with a tractor drawn baler and accumulate a batch of ten bales. The accumulator deposits the bales in orderly batches on the ground behind the array as the tractor moves at any selected speed by tilting the storage platform on which the bales are stored to slide the bales therefrom. The power consumption is low for the mechanisms operating the accumulator and can be derived from the standard tractor hydraulic system. A simplified low cost and easily maintained operating mechanism for the accumulator consists of two control devices actuating two hydraulic cylinders which respectively load bales from the baler onto the storage platform and tilt the storage platform for unloading an accumulated batch of bales on the ground.

4 Claims, 10 Drawing Figures

TILTING PLATFORM HAY BALE ACCUMULATOR

TECHNICAL FIELD

This invention relates to agricultural machinery and more particularly it relates to mobile hay bale accumulators for receiving a batch of bales from a baler for temporary storage and then discharging the batch to the ground in an ordered array permitting mechanical recovery thereof.

BACKGROUND ART

Mobile hay bale accumulators which accompany tractor drawn hay balers to accumulate and temporarily store a batch of bales, are known in the art. However, these prior art accumulators as represented for example by U.S. Pat. Nos. 3,373,882, Mar. 19, 1968, S. L. Forest; 3,159,287, Dec. 1, 1964, H. R. Stroup; 3,157,295, Nov. 17, 1964, C. W. Pridgeon et al., and 3,163,302, Dec. 29, 1964, C. W. Pridgeon and "Farmhand" brand accumulators on the market have significant operational deficiencies. For example, the bales are pushed off the accumulator by a conveyor chain arrangement. This causes multiple problems such as a required adjustment of conveyor discharge speed with the ground speed of the tractor to permit bales to be discharged in an ordered batch in side-by-side adjacent relationship for recovery by a mechanized loader. Thus, bales may be scattered or disoriented upon discharge. Also a complex costly chain and drive mechanism which tends to accumulate litter thereby requiring careful maintenance, and necessitating significant driving energy is required.

Further deficiencies of the prior art appear when bales must be lifted, turned and/or placed in position by complex mechanisms. The simpler a mechanism, the more reliable it is in the field. Also significant operating energy is required which makes it difficult to operate from a standard tractor with a conventional hydraulic system of limited external power capabilities. Some mechanisms so twist and distort the bale shape when being handled that they are not properly processed with automatic loading equipment and in some cases causes the baling cord to break. Auxiliary attachments for moving bales or for providing hydraulic power are cumbersome, expensive and difficult to maintain in the field, and are certainly not efficient in energy consumption, even when they can be compatibly attached to or used with hay bale accumulators.

Furthermore, an increase of load capacity of a given size accumulator storage platform is desirable. Thus it is desirable to have batch loads of ten standard size hay bales on an accumulator platform, whereas many accumulators with the same platform area are limited to eight bales.

Therefore it is a general objective of this invention to provide improved hay bale accumulators of improved performance capabilities which are nevertheless simpler, less expensive and more efficient in operation.

It is a more specific object of the invention to provide improved hay bale accumulators with simplified mechanisms operable from the standard hydraulic system of a tractor.

Another object of the invention is to accumulate batches of ten bales with a loading mechanism without twisting or distortion of the bales.

Still another object of the invention is to provide a simplified bale discharge system which is compatible to different tractor speeds and which discharges batches in an ordered side-by-side relationship adaptable for processing by mechanical loading devices.

DISCLOSURE OF THE INVENTION

A simplified mobile wheeled hay bale accumulator unit provided by this invention mates with a tractor drawn hay baler and receives the bales on a platform for temporary storage while accumulating batches of ten bales, whereupon the bales are discharged in a batch on the ground behind the accumulator for later mechanized retrieval and removal.

The accumulator has a simplified actuation control mechanism powered by two periodically actuated hydraulic cylinders from energy derived from a standard tractor hydraulic system. These cylinders are coupled to two simplified control mechanisms comprising simple tiltable platforms movable into two positions by the hydraulic cylinders.

Thus, a first pivoted loading mechanism is positioned to receive two sequential bales from the baler. When the two bales are in place for loading on the accumulator, the loading mechanism is tilted by the hydraulic cylinder to rotate the bales one-quarter turn into position on the edge of an accumulator platform for temporary storage until a batch of ten is accumulated, each pair of bales sliding the preceding accumulated bales across the platform until the capacity of ten bales is achieved.

The loading platform having an open rear end will hold ten bales of rectangular cross section as delivered from the baler on their wider side, because the bales are given a quarter turn to rest on their narrower side. Otherwise the accumulator platform capacity would be a batch of eight bales resting on their wider side.

When the ten bales are loaded in position on the accumulator platform a single hydraulic cylinder tilts the platform about a pivot point to let the bales slide by gravity off the open end of the platform onto the ground at any appropriate tractor speed.

A simple two valve hydraulic control circuit operates the two single acting hydraulic cylinders from a sensor showing bale position. The cylinders are retracted by spring bias as aided by return weight of the movable elements and gravity. The hydraulic energy thus is available from the standard hydraulic system of the tractor and does not necessitate an auxiliary hydraulic energy source required in more complex accumulator systems.

A further embodiment for use with constant displacement hydraulic pump systems is provided also which uses a more complex control valve arrangement for loading bales.

BRIEF DESCRIPTION OF THE DRAWINGS

Further objects, features and advantages of the invention will be found throughout the following more detailed description made with reference to the accompanying drawing, wherein.

DETAILED DESCRIPTION OF A PREFERRED EMBODIMENT

Figure 1:
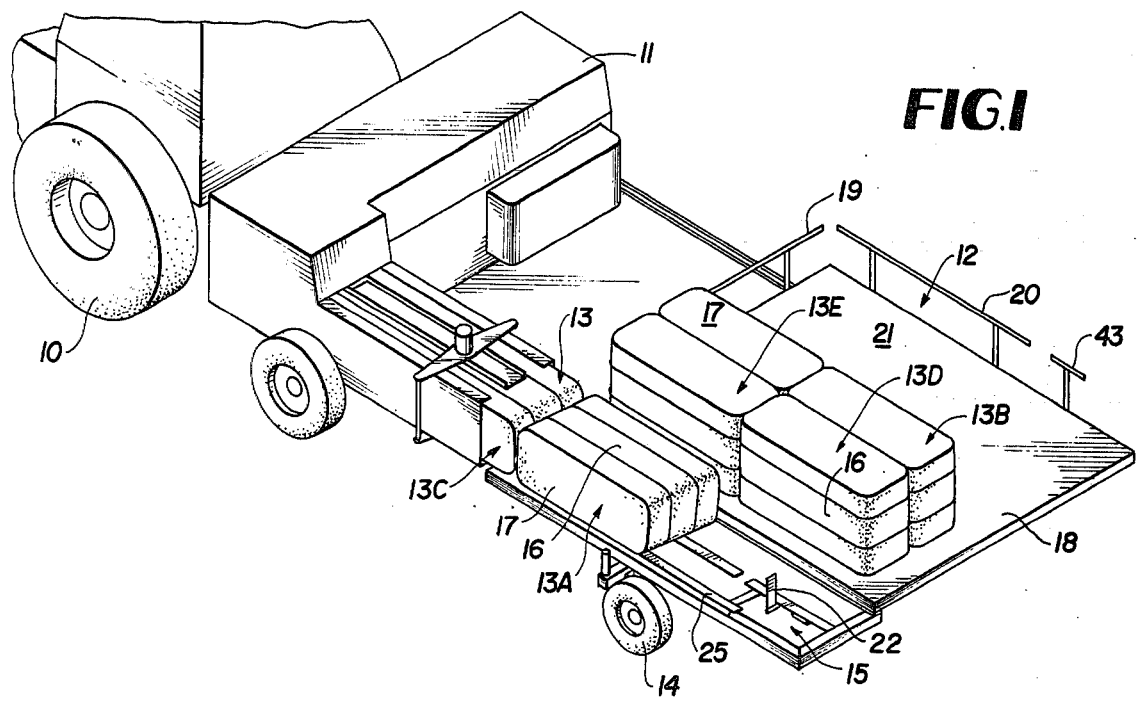
FIG. 1 is a perspective sketch of a hay bale accumulator as afforded by this invention mating with a tractor drawn hay baler.

The bale accumulating system is seen from FIG. 1 wherein a tractor 10 pulls a hay baler 11 to which is attached the mobile wheeled accumulator unit 12 in mating position to receive hay bales 13 etc. delivered by the baler 11. The tractor 10 has a standard hydraulic system (not shown) interconnected to the accumulator unit 12 for energizing the hydraulically operable mechanisms thereof in the manner hereinafter described. Also the tractor 10 provides motive power to pull the accumulator unit on wheels 14 behind the baler unit 11. Attachment hitches (not shown) hold the accumulator unit 12 in mated position with baler 11 to receive bales 13 which are pushed rearwardly along the loading platform 15 of the accumulator unit.

As shown the hay bales 13 have a rectangular cross section with wider 16 and narrower 17 sides and are delivered by the baler 11 on their wider sides 16.

The accumulator unit 12 has a platform 18 for receiving the bales 13 thereon in temporary storage until a batch of bales is accumulated to fill the storage platform capacity. In this preferred embodiment a batch of ten bales is accumulated. To increase the capacity of the storage platform 18 from eight bale batches to ten, the bales are rotated one-quarter turn from delivered position on the wider sides 16 to rest on their narrower sides 17 on the platform 18.

The platform 18 has an open rearmost end for facilitating discharge, as will later be described, and has railings 19, 20 to limit the front and side bale positions respectively. For purposes later described the platform surface 21 is smooth to permit the bales 13 to slip off the platform toward the rear.

Figure 2:
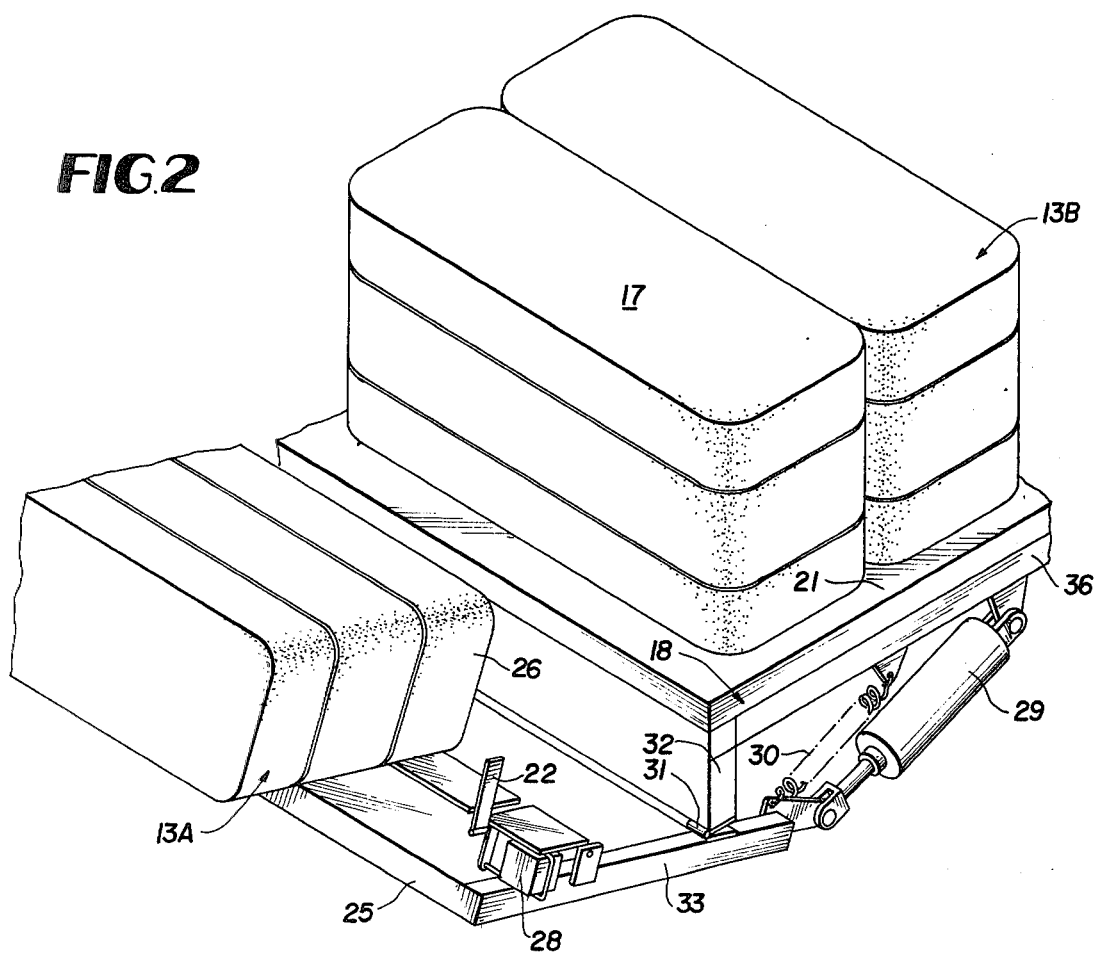
FIG. 2 is a sketch showing the operation of the hydraulic cylinder loading mechanism which transfers bales of hay from the baler to an accumulating platform.

In the accumulator platform 18 loading operation, therefore, two sequential bales 13A, 13C are delivered by baler 11 and pushed rearwardly along loading platform 15. When the two bales are in place for loading the rearmost bale 13A operates hydraulic valve trigger 22 to initiate the loading cycle which can best be visualized by observation of FIGS. 1 and 2.

Thus, a pivoted loading mechanism 25 is positioned adjacent storage platform 18 to pivot from a bale receiving position shown in FIG. 1 to a bale delivery position placing the bales upon the platform surface 21 of the storage platform 18. This pivoting action turns the bale one-quarter turn while loading in an action that permits simple mechanization and exertion of minimal energy since no lifting of the bale off any surface is required but simply a pivoting about the edge 26 of the loading platform surface 21 to sit upon that surface 21. As the pivoting of loading mechanism 25 takes place it shoves a bale being loaded (13A, 13C) against the resident bales (13D, 13E) and displaces the accumulated bales toward the side railing 20.

Therefore when bale 13A reaches and operates trigger 22 for loading hydraulic valve 28, then hydraulic cylinder 29 is actuated to overcome return spring 30 and pivot the loading mechanism 25 with the bales thereon about pivot point 31 shown as a hinge connecting frame member 32 to loading mechanism arm 33. Then when the pivoting action is completed and the bales are in place, the valve 28 may be operated by a biased self return position of trigger 22 to retract cylinder 29 which in the case of a single acting cylinder may be retracted by force of the spring 30. This returns the pivoted loading mechanism 25 into place for receiving a further set of two bales. The position of frame member 36 upon which the cylinder 29 is anchored is such that the storage platform 18 may be pivoted for discharge of the accumulated bales as signified in FIG. 3, but is shown somewhat schematically in FIG. 2 to better illustrate its mode of operation in conjunction with hydraulic valve 28 and the pivoted loading mechanism 25 without complicating the drawing, and the preferred positioning is indicated by similar reference numbers in the FIG. 3 embodiment.

Figure 4:
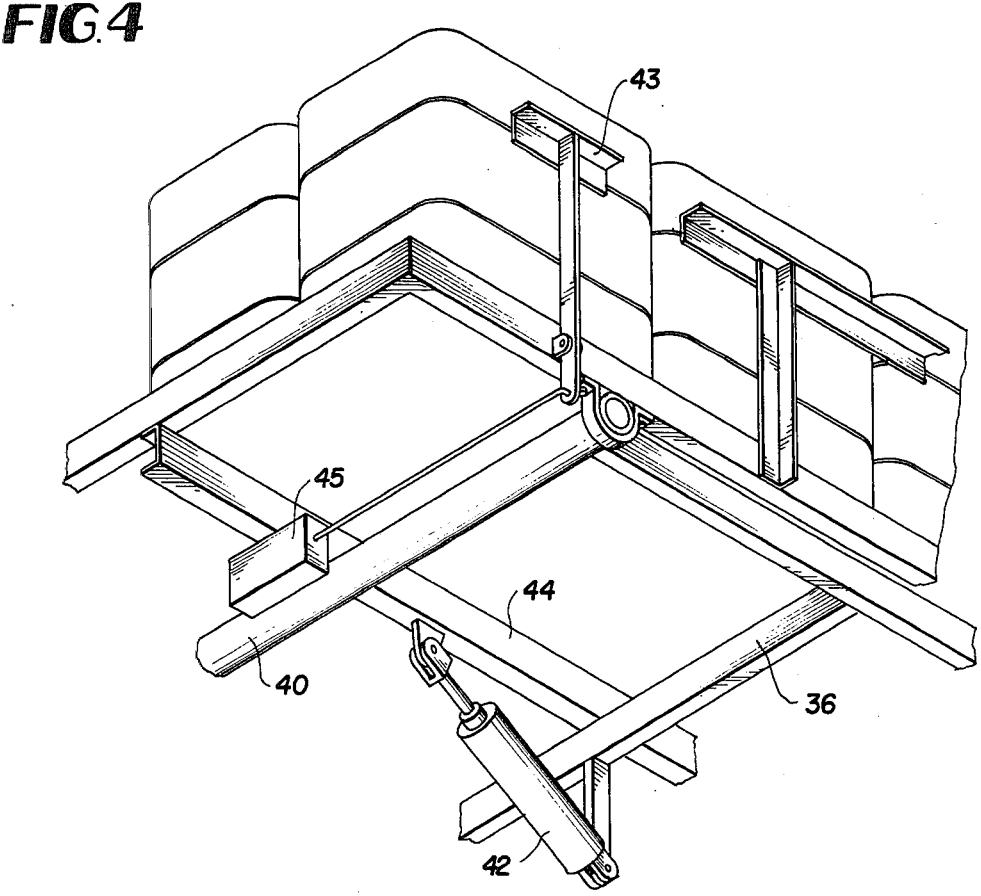
FIG. 4 is a partial sketch in perspective of the hydraulic cylinder mechanism which tilts the platform to unload a batch of accumulated bales.
Figure 3:
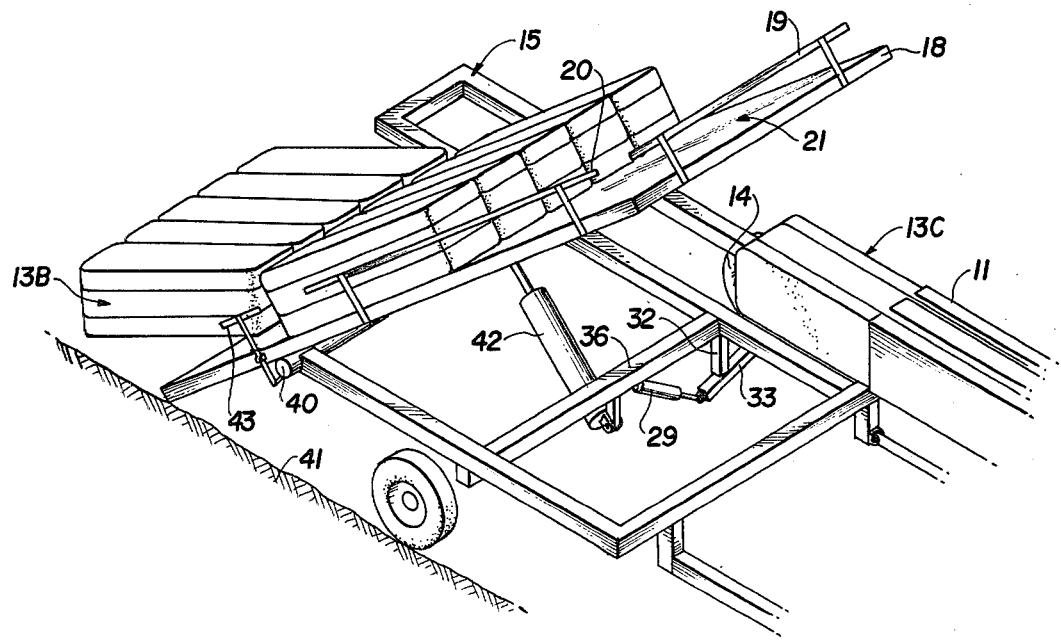
FIG. 3 is a perspective view of the tilting platform accumulator of this invention discharging a batch of hay bales accumulated thereon.

Thus, as may be seen by consultation of FIGS. 3 and 4, the loaded accumulator platform is tilted about pivot axis 40 to let bales 13B, etc. slide down the platform surface 21 by force of gravity to meet the ground 41 without disturbing the side-by-side positioning significantly, thereby permitting the batches of bales to be retrieved by mechanical lifts without manual intervention required in the case that the positioning of the bales is disturbed significantly when unloaded.

Additionally this mode of discharge permits a very simple actuating mechanism, where a single hydraulic cylinder 42 is actuated by trigger 43 when the last bale 13B is in place against railing 20 to tilt the accumulator platform 18. As may be seen the platform unloads the bales by force of gravity as they slide downwardly into gentle contact with the ground 41 while the tractor draws the baler-accumulator assembly forward.

The platform is pivoted at 40 off center in the preferred operational mode so that it returns automatically by force of gravity to loading position when the bales 13 are fully discharged. Thus, a retraction spring is not necessary for hydraulic cylinder 42, and it simply provides a tilting pressure against storage platform 18 frame member 44 from its anchored position against the accumulator frame member 36, so that the storage platform 18 tilts about pivot rod 40. The hydraulic valve trigger 43 actuates valve 45 to initiate the tilting cycle when the platform is fully loaded so that a bale bears against the trigger member 43.

It is clear therefore that a simple mode of operation is provided and yet many advantages are offered over prior art devices. There are no chain drives to get dirty, require maintenance and to chew into bales. There are no distorted or twisted bales. The energy required for operation of the mechanisms is so little that standard tractor hydraulic units are used without auxiliary hydraulic units. Yet the device works well, deposits batches of bales gently on the ground in ordered side-by-side fashion and is reliable under the dusty, dirty field conditions surrounding the hay baling operation. Furthermore the hydraulic control system is simple and effective as shown in the respective views of FIGS. 5 and 6.

It is readily seen that the control system of FIG. 5 is a variable displacement system returning hydraulic fluid obtained from power source 51 to the sump 52.

The controls consist of only two hydraulic cylinders 29 and 42 respectively for loading and unloading bales and two control valves 28, 45 for operating the respective loading and unloading cycles. It has been before shown that return spring 50 is not necessary for cylinder 42, but the springs 30 and 50 signify the single acting nature of hydraulic cylinders 29 and 42.

Figure 5A:
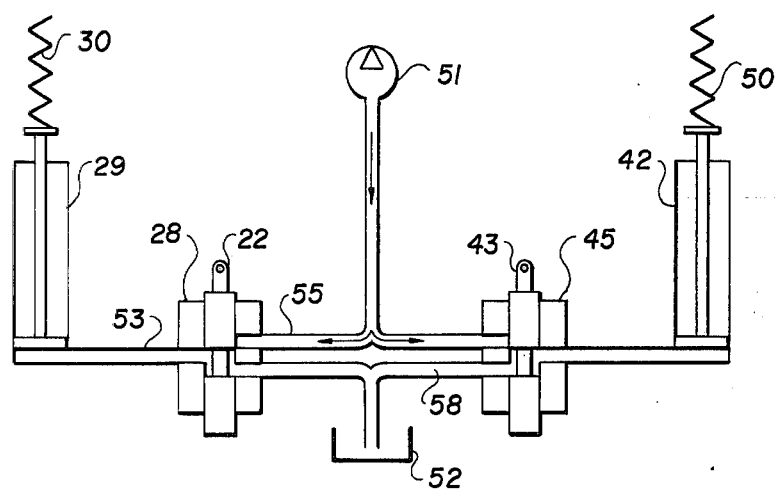
FIGS. 5A, B and C are respective hydraulic control system sketches indicating the simplified hydraulic control system operating the accumulator hydraulic cylinders respectively in static condition, loading position and unloading position in a variable displacement hydraulic pump system returning fluid to a reservoir.

As shown in FIG. 5A, the system when static has fluid under pressure available from the tractor hydraulic system source 51. Thus control valves 28 and 45 can alter the flow paths in the manner schematically shown by the flow paths with the arrows showing fluid under pressure of source 51 or spring 30, etc.

Figure 5B:
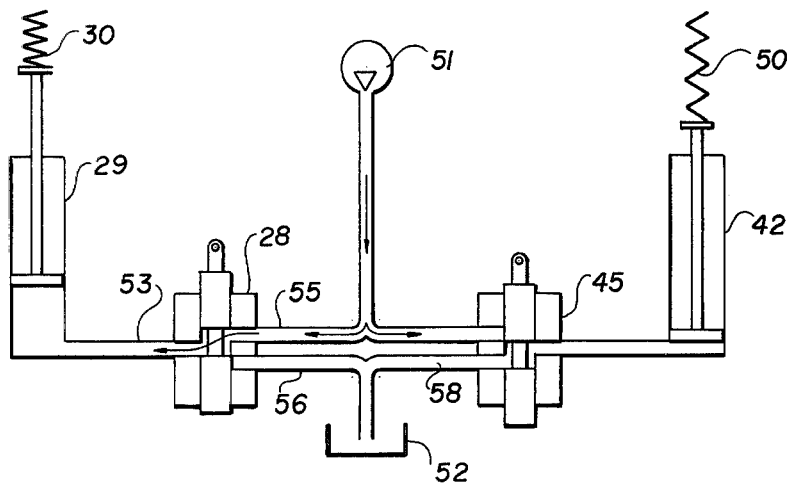
Figure 5C:
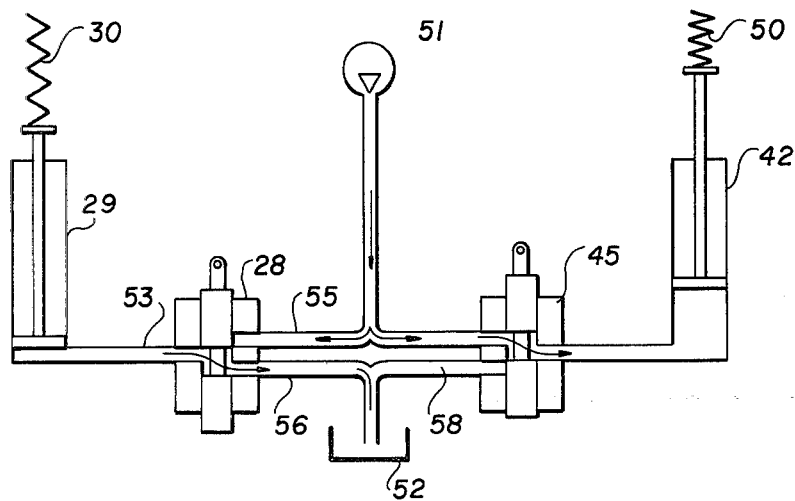

In FIG. 5B the valve 28 is actuated as aforesaid by presence of bales in position for loading on the accumulator deck. This causes loading cylinder 29 to be actuated to pivot the loading mechanism in the manner hereinbefore described by fluid from the source 51 under pressure passed through the valve 28 outlet line 53 to operate cylinder 29. The residual fluid in cylinder 29 is returned to sump 52 as shown in FIG. 5C by return of the piston in cylinder 29 by spring 30 when valve 28 is returned to close flow toward cylinder 29. Valve inlet 55 is always connected to the fluid source 51 and valve outlet 56 is always connected to the sump 52. Also valve 45 outlet 58 is always connected to sump 52. Thus the load trigger (22, FIG. 2) moves the spool of valve 28 to divert the path from inlet 55 to flow through outlet 53 to cylinder 29 and back into outlet 56 to thereby operate the loading cylinder 29.

In the FIG. 5C unloading cycle valve 28 simply returns to its quiescent neutral mode of FIG. 5A after the fluid from cylinder 29 is pushed into sump 52. Then the trigger mechanism (43, FIG. 4) moves the spool to change the flow path through unloading valve 45 to operate the unload cylinder 42 in the same mode as described for the valve 28.

Note that in this preferred hydraulic system there is no complexity, standard parts are used and single acting cylinders that do not require complex control circuits or use extra hydraulic energy by having to return the cylinders to their rest position awaiting another cycle.

Figure 6A:
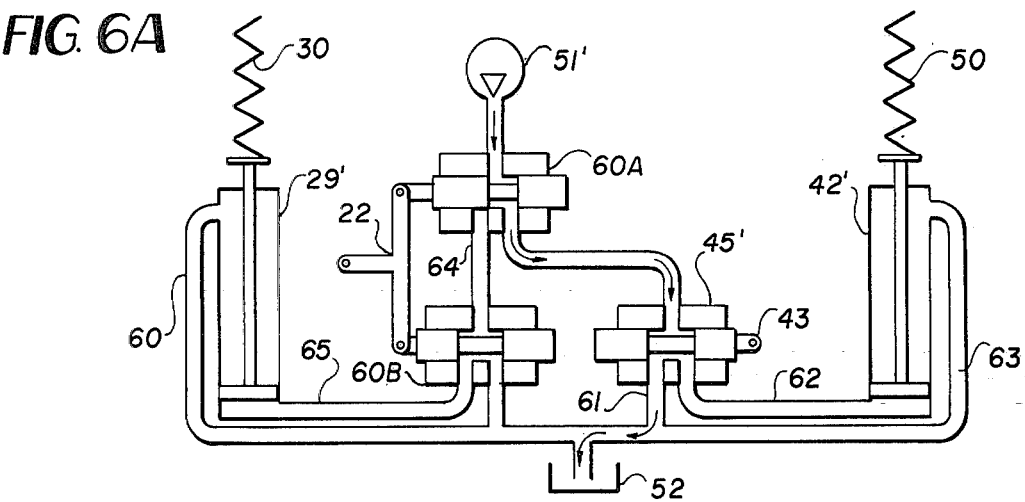
FIGS. 6A, B and C are similar respective set of sketches for a constant displacement hydraulic pump system.
Figure 6B:
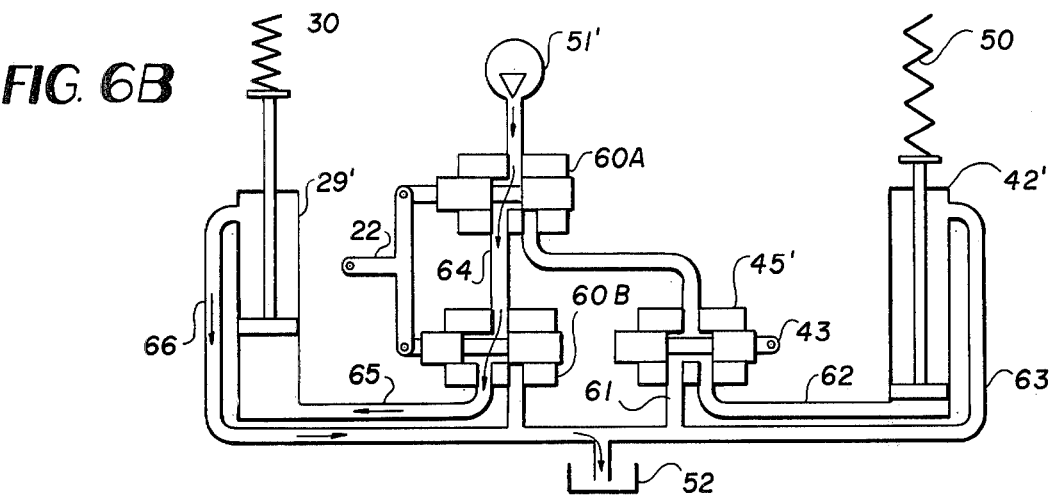

In FIG. 6 similar reference characters are primed to note variations. Thus, with a fixed displacement hydraulic pump source 51' the double acting cylinders 29' and 42' are used. In this version when the loading trigger 22 is actuated it controls both valves 60A and 60B, and valve 45' moves its modified spool to transfer flow by blocking flow of fluid in line 61 to the sump 52 and causing it to actuate cylinder 42' through line 62, and the cylinder displaces fluid into the sump 52 along line 63.

Basically the function equipment operation is the same for both the FIG. 5 and FIG. 6 versions. That is, when trigger 22 is actuated cylinder 29 actuates to load a bale on the accumulator, and when trigger 45 is actuated cylinder 42 actuates to unload a set of bales from the accumulator.

Thus, FIG. 6A shows the hydraulic system awaiting action with neither trigger operated. When trigger 22 is operated to move spools of both control valves 60A and 60B then the path of flow of fluid from source 51' is transferred to flow through lines 64 and 65 into cylinder 29'. Then fluid passing out of cylinder 29' on line 66 goes into sump 52. When the bale is loaded, trigger 22 returns the valve spools to the original condition as shown in FIG. 6C.

Figure 6C:
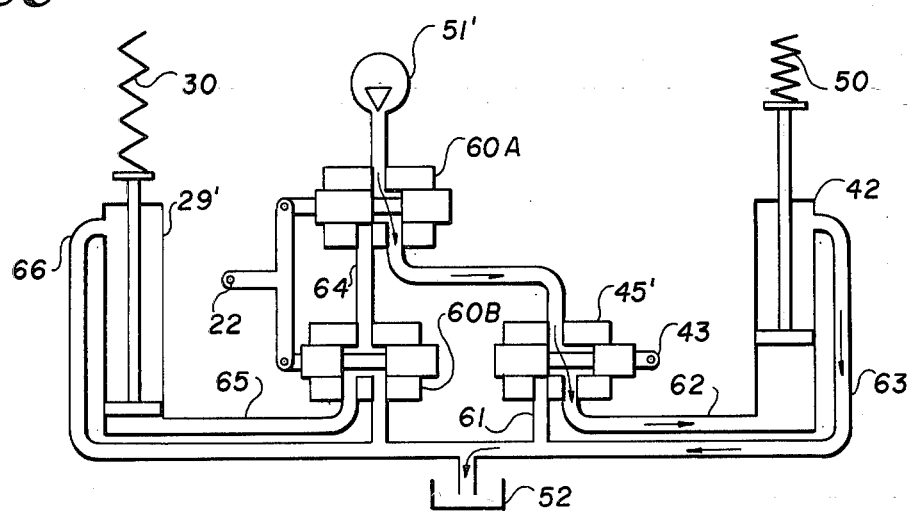

However in FIG. 6C the trigger 43 has been actuated to dump the bales from the accumulator deck, and thus transfers fluid flow from the source 51' to actuate cylinder 42' and send fluid along line 63 back to sump 52 by the cylinder action. When the unloading cycle is finished then the system returns to the condition of FIG. 6A by return of the spool of control valve 45'.

Having therefore set forth novel advances in the art, the novel features thereof believed descriptive of the spirit and nature of the invention are defined with particularity in the claims.

INDUSTRIAL APPLICATION

A mechanized hay baling and retrieval system incorporates a novel hay bale accumulator mating and moving with a tractor drawn baler. The accumulator is simple, reliable and inexpensive with a simplified mechanical system using only a simple tilting table loading member operable with one hydraulic cylinder and a tilting storage platform for discharging each batch of stored bales in the ground as the tractor moves. A simple two valve hydraulic control system operates from the tractor hydraulic system. Thus the bales are mechanically formed, accumulated and dropped in batches for retrieval by a mechanized lift to permit hay baling without manual labor.

I claim:

1. Hay baling apparatus comprising in combination, a mobile hay baler for producing bales with a rectangular cross section presenting wider and narrower sides and delivering them under baler power to move rearwardly as the baler moves forward on their wider sides at a platform level disposed above the ground, a wheeled mobile accumulator attached to and movable with the baler having a platform above its wheels disposed above ground at said platform level to receive from said baler a sequence of hay bales for temporary storage and discharge to the ground in ordered batches suitable for mechanized retrieval, said accumulator comprising, means disposing a tiltable portion of said platform into registration for receiving from the baler to move rearwardly on the platform under baler power into a row of a plurality of bales disposed rearwardly on the platform in a temporary longitudinal storage position thereon, power means located on the accumulator for moving said plurality of bales into an array of side-by-side rows, tilting means operable from the power means on the accumulator pivoting said tiltable portion of the platform thereby comprising loading means positioned adjacent one edge of said platform for receiving said bales delivered from said baler and rotating them one-quarter turn into place on the edge of a further part of the platform on their narrower sides thereby permitting rows of bales to accumulate side-by-side on the platform and requiring little driving force from the power means on the accumulator for loading the platform, a sensor mounted on said tiltable portion of the platform and movable therewith for actuating the tilting means when bales from the baler are in place, a platform discharge mechanism including platform pivot means operable from further power means disposed on the accumulator for tilting the platform to permit accumulated rows of bales to slide down the platform by force of gravity and rest on the ground behind the moving accumulator without a substantial drop to thereby reside in a batch relationship substantially identical with that on the platform, the accumulator bale handling means thereby consisting of two hydraulic cylinder actuated pivot means respectively for tilting one platform portion to accumulate bale rows and tilting another platform portion to discharge the bales, and a hydraulic control system for operating respectively the cylinders consisting of a pair of control valves, and valve positioning means for operating the control valves respectively in response to presence of said plurality of bales in said row and said plurality of bales in said array of rows wherein each cylinder has spring return means and each valve consists of a two position valve mechanism operable by the valve positioning means directing fluid under pressure selectively in one valve position to operate the cylinder against the spring return means from a power source of fluid under pressure and in the other valve position to direct fluid flow from the cylinder under spring pressure to a fluid storage tank.

2. Hay baling apparatus as defined in claim 1 including actuating means for tilting said platform part to discharge bales consisting of a single hydraulic cylinder motive device.

3. Hay baling apparatus as defined in claim 1 wherein said loading means comprises actuating means for operation of said loading means consisting of a single hydraulic cylinder motive device tilting said platform.

4. The apparatus as defined in claim 1 wherein each valve consists of a flow transfer path from one fluid line to two fluid lines

* * * * *